(No Model.) 2 Sheets—Sheet 1.

C. H. CLAWSON.
ACTUATING DEVICE FOR CYCLOMETERS.

No. 508,406. Patented Nov. 14, 1893.

WITNESSES:
H. A. Carhart
D. May Goodrich

INVENTOR
Chas H. Clawson
By Smith & Brunson
ATTORNEYS.

THE NATIONAL LITHOGRAPHING COMPANY,
WASHINGTON, D. C.

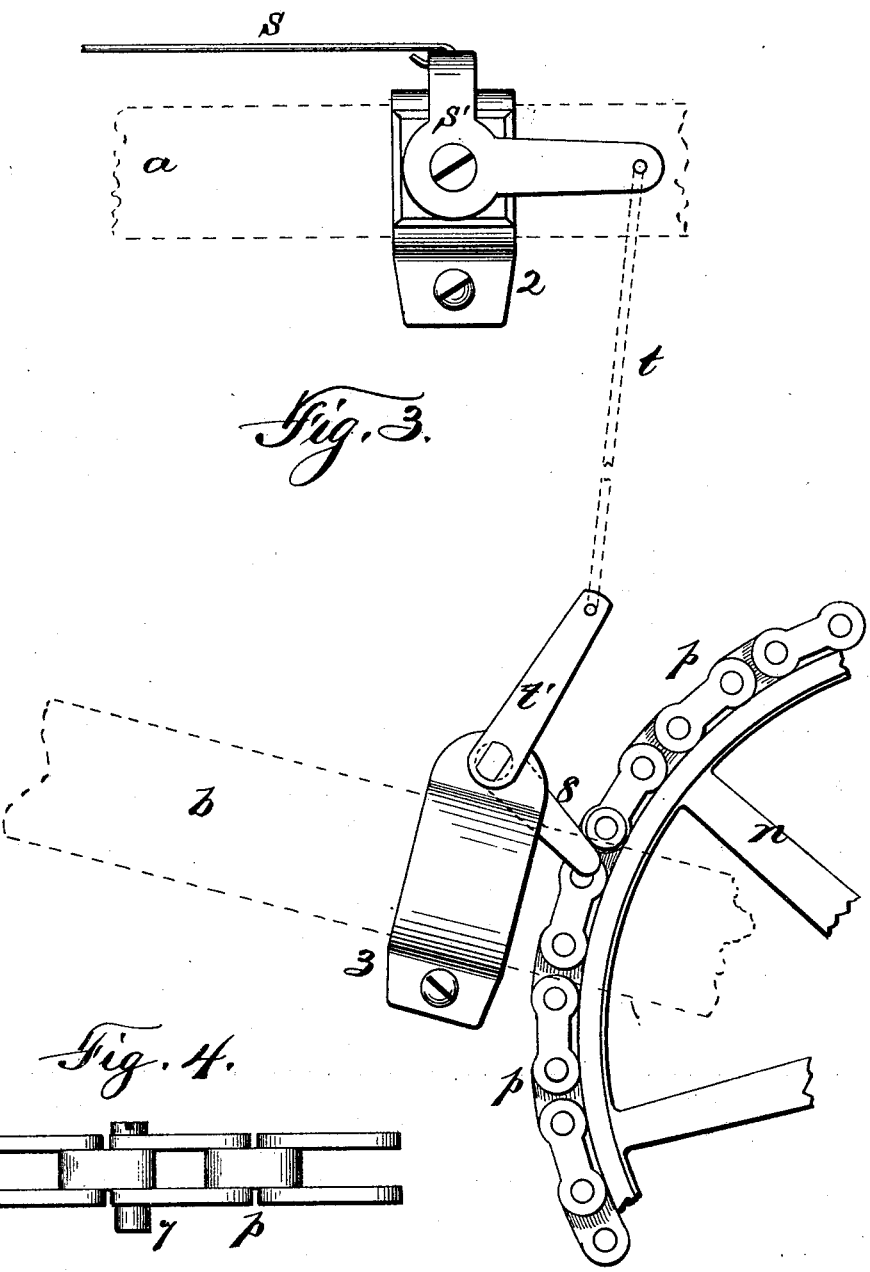

United States Patent Office.

CHARLES H. CLAWSON, OF WATKINS, NEW YORK.

ACTUATING DEVICE FOR CYCLOMETERS.

SPECIFICATION forming part of Letters Patent No. 508,406, dated November 14, 1893.

Application filed May 6, 1893. Serial No. 473,189. (No model.)

*To all whom it may concern:*

Be it known that I, CHARLES H. CLAWSON, of Watkins, in the county of Schuyler and State of New York, have invented new and useful Improvements in Cyclometers, of which the following, taken in connection with the accompanying drawings, is a full, clear, and exact description.

My invention relates to cyclometers or instruments by which the distance traveled by a vehicle is automatically registered, and particularly to the means or mechanisms by which the cyclometer is operated.

My object is to provide a bicycle (for illustration) with a mechanism actuated by the travel of the same, whereby the cyclometer attached thereto, is operated automatically, comprising a combination of bell-crank-levers and connecting rods connected to the cyclometer, and actuated by the regular engagement of the drive chain with one of said bell-crank levers, whereby each revolution of said chain through said mechanism is registered upon the cyclometer, and as each revolution of said chain represents a fixed number of feet traveled by the drive wheel for each of said revolutions, so the distance traveled is registered by the number of revolutions of the chain.

My invention consists in the several novel features of construction and operation hereinafter described and which are specifically set forth in the claim hereinto annexed.

It is constructed as follows reference being had to the accompanying drawings in which—

Figure 1:
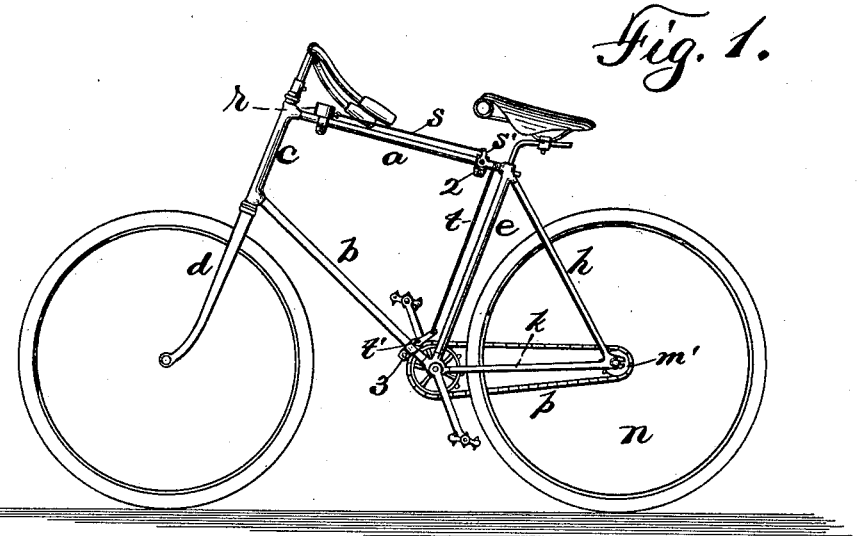
Figure 2:
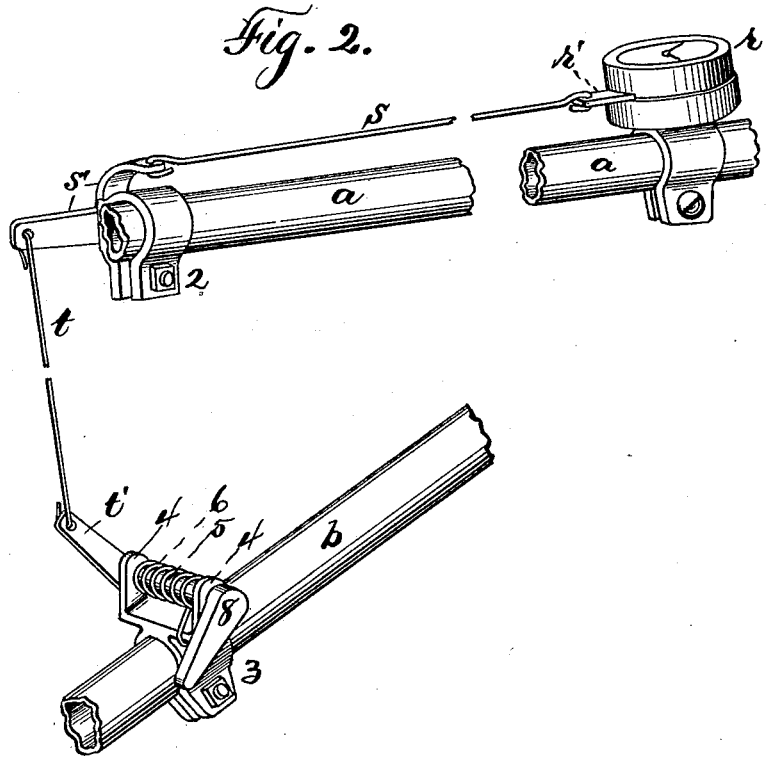

Figure 1, is a side elevation of a bicycle with my attachment applied thereto. Fig. 2, is an enlarged detail of part of the frame and my attachment applied thereto, broken away as shown. Fig. 3, is an enlarged detail of a bell-crank mechanism and part of the drive wheel and drive chain, shown partly in full lines and partly in dotted lines. Fig. 4, is a detail of part of the drive chain showing the projecting head upon one side thereof, which actuates the bell-crank mechanism with each revolution of the chain.

The frame of the bicycle is constructed in the usual manner, consisting of the top rail —a—, the bottom rail —b—, head —c—, the steering fork —d—, the vertical seat-supporting brace —e— and the rear bars —h— and —k—, and the driving-wheel —m— is mounted upon the frame in the ordinary manner, while —m'— is the driving pinion secured upon the shaft of the drive wheel —m— in the ordinary manner and driven by the chain —p—. A cyclometer —r— is mounted upon the top rail —a— as a convenient place therefor, but as the internal construction of this cyclometer is the subject of another application filed May 6, 1893, Serial No. 473,188, the same is not specifically described herein further than to say that the registering is caused therein by the reciprocation of a sliding-bar —r'—, this mechanism so sought to be patented being the mechanism by which that sliding bar is operated to effect the registering. A rod —s— is connected to said sliding bar at one end and at the other end to a bell-crank-lever —s'—, while —t— is a rod connected to the other arm of said bell-crank-lever and also to the bell-crank lever —t'—.

The bell-crank —s'— is adjustably mounted upon the top rail —a— by means of the spring grip —2— and the bolt passed through the arms thereof. The bell-crank —t'— is also mounted upon a similar grip block —3— adjustably mounted upon the frame bar —b— and provided on its upper end with the studs —4— in which the body or shaft —5— of the bell-crank is journaled; and —6— is a spring around said shaft and engaging therewith to return the said bell-crank to its normal position whenever diverted therefrom.

One of the cross bolts or rivets connecting the links of the drive chain is adapted to project as shown in Fig. 4, at —7—, in such manner that each revolution of the drive chain will bring said projection —7— into contact with the arm —8— of the bell-crank —t'— and through the bell-cranks and their connecting rods or sliding bar —r'— is drawn out and when said arm —8— is released from said stud —7— and the spring —5— throws the parts back to their normal position, and one revolution of the drive chain is registered upon the cyclometer.

As each bicycle is geared to a certain pitch or degree and as each revolution of the drive wheel causes the driven wheel to travel a fixed and predetermined distance, so each revolution of the drive chain represents the number of feet traveled by the driven wheel, and the number of such revolutions being registered by the cyclometer, the distance traveled is readily ascertained.

While here shown and described as applied to a bicycle, it will be readily seen that, with some minor changes in the mountings of the bell-crank levers and the connecting rods, the mechanism can readily be applied to any vehicle so that while the term bicycle is used in the claim it is understood and should be understood that the word bicycle, wherever it appears herein and in the claim, includes all classes of vehicles, to which the mechanism can be applied; and all equivalent constructions which are modifications of this operating mechanism or equivalents to each or all of the parts composing the same or of any other mechanism.

What I claim as my invention, and desire to secure by Letters Patent, is—

The combination with a bicycle and a cyclometer mounted thereon, and the driving chain operated in the ordinary manner, of a mechanism consisting of bell-cranks and connecting rods connected to the cyclometer and with which the driving chain intermittently engages to operate said mechanism.

In witness whereof I have hereunto set my hand this 19th day of April, 1893.

CHAS. H. CLAWSON.

In presence of—
C. W. SMITH,
HOWARD P. DENISON.